United States Patent
Diaz Perez (12) 
(10) Patent No.: US 11,001,136 B1
(45) Date of Patent: May 11, 2021

(54) ALTERNATOR SYSTEM FOR ELECTRIC VEHICLES HAVING AT LEAST ONE WHEEL AXLE

(71) Applicant: Lissett Diaz Perez, Miami, FL (US)

(72) Inventor: Lissett Diaz Perez, Miami, FL (US)

( * ) Notice: Subject to any disclaimer, the term of this patent is extended or adjusted under 35 U.S.C. 154(b) by 0 days.

(21) Appl. No.: 17/166,243

(22) Filed: Feb. 3, 2021

(51) Int. Cl.
    *B60K 7/00*     (2006.01)

(52) U.S. Cl.
    CPC .... *B60K 7/0007* (2013.01); *B60K 2007/0038* (2013.01); *B60L 2220/44* (2013.01)

(58) Field of Classification Search
    CPC .......... B60K 7/0007; B60K 2007/0038; B60L 2220/44
    See application file for complete search history.

(56) References Cited

U.S. PATENT DOCUMENTS

| | | | |
|---|---|---|---|
| 7,059,437 B2 * | 6/2006 | Heinen | B60K 17/30 180/65.51 |
| 2011/0114404 A1 * | 5/2011 | Lee | B60L 50/16 180/65.51 |
| 2016/0344246 A1 * | 11/2016 | Fraser | H02K 7/14 |
| 2019/0248225 A1 * | 8/2019 | Kawamura | H02K 21/22 |
| 2019/0383340 A1 * | 12/2019 | Seaman | H02K 9/02 |
| 2020/0198456 A1 * | 6/2020 | Kawamura | B60K 7/00 |

\* cited by examiner

*Primary Examiner* — Bryan A Evans (74) *Attorney, Agent, or Firm* — Ruben Alcoba, Esq (57) ABSTRACT

An alternator system that will recharge a battery or a battery bank of an electric vehicle that uses wheeled axles to propel itself. The alternator system is mounted on the wheel hub of a vehicle using a spacer, a housing that covers the alternator, and a specially designed brake caliper rotation stop that is mounted on the housing that allows the alternator to remain in a fixed position when mounted on the wheel hub of the vehicle.

4 Claims, 7 Drawing Sheets

ALTERNATOR SYSTEM FOR ELECTRIC VEHICLES HAVING AT LEAST ONE WHEEL AXLE

BACKGROUND

The present invention is directed to an alternator system that will recharge a battery or a battery bank of an electric vehicle that uses wheeled axles to propel itself.

The present invention uses the mechanical movement of the axles of a wheeled vehicle to power the alternator system of the present invention.

The inventor of the present invention realized that the mechanical force that was being provided by the movement of the axles of the wheeled vehicle could be used to power an alternator that could help recharge or energize the battery or battery bank of an electric vehicle.

After pondering how she could incorporate the mechanical force of the wheeled vehicle to an alternator, she devised the present invention.

She realized that she needed to build a spacer or extension that would fit within an axle of an alternator that would secure the alternator to a wheel hub of a vehicle and at the same time secure a tire rim to the spacer, thereby acting as the extended wheel hub of the vehicle.

She also realized that she had to have a rotor and bearing mount that would also attach to the wheel hub after the spacer was placed over the wheel hub and that both the rotor and bearing mount and the spacer had to be secured to the wheel hub in order to provide the mechanical energy to the rotor of the alternator.

She further realized that she would have to fixedly attach a rotor to the rotor and bearing mount and that she would need a pair of bearings on the rotor and bearing mount to allow a stator and a stator housing to remain in place when the rotor was rotated. She realized that the outer sides of the bearings had to be attached to the housing as well as the stator.

She next realized that she had to hold the housing in place, for if not, friction would eventually allow the housing to spin concurrently with the rotor, so she developed a cover that would attach to the housing that would have a brake caliper rotation stop that would be mounted over an existing brake caliper of a wheeled vehicle.

The present invention is a device that captures mechanical energy that is created by a spinning axle of a vehicle and that converts it into an electrical energy that will recharge a vehicle battery or a battery pack of an electric vehicle.

For the foregoing reason there is a need for an alternator system that will recharge a battery or a battery bank of an electric vehicle that uses wheeled axles to propel itself.

SUMMARY

The present invention describes an alternator system that will recharge a battery or a battery bank of an electric vehicle that uses wheeled axles to propel itself.

The alternator system is an alternator that has some of its structural elements modified in order to be used on a wheel hub of a wheel propelled vehicle. It uses a specially designed spacer that fits within an axle of an alternator to allow the alternator to be attached between a wheel hub of a vehicle and a tire rim that is mounted on a vehicle. It uses a specially designed housing that mounts over the alternator that allows the alternator to remain in place while the axle of the vehicle revolves. It also uses a brake caliper rotation stop that mounts on a brake caliper of a vehicle in order to maintain the alternator in a fixed position, thereby allowing the rotor and stator of the alternator to create a current when the axle of the vehicle rotates. The present invention uses all elements presently used in the art of alternators to create energy, yet the structure of the present device is specifically designed to fit over the wheel hub of an existing vehicle. It is foreseen that fans could be used to cool the alternator, yet it is believed that the airflow that hits the vehicle while in movement would serve to cool the alternator (s) of the present invention. It is foreseen that an alternator system as described in this application would be used on all axles of a vehicle.

An object of the present invention is to provide an alternator system that can be mounted on each axle of a vehicle and that can be used to recharge the battery or battery pack of an electric vehicle when the vehicle is in movement.

Another object of the present invention is to provide an alternator system that will reduce carbon emissions.

Yet another object of the present invention is to provide an alternator system that will extend the mileage between the recharges of an electric vehicle.

DRAWINGS

These and other features, aspects, and advantages of the present invention will become better understood with regards to the following description, appended claims, and drawings where:

DESCRIPTION

Figure 1:
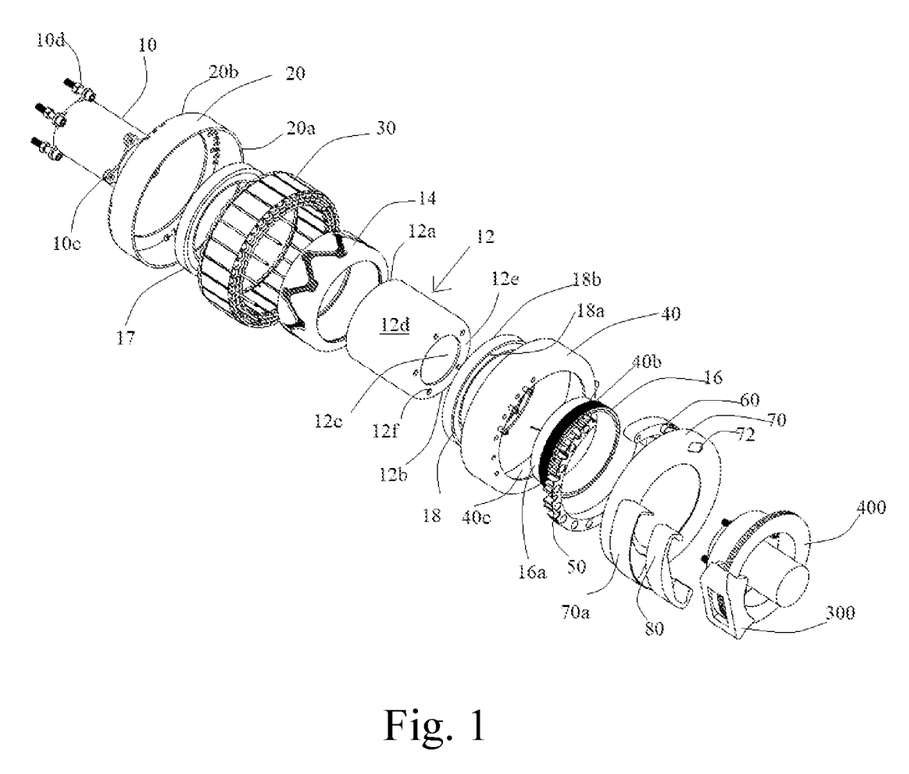
FIG. 1 is a perspective exploded view of the present invention.
Figure 2:
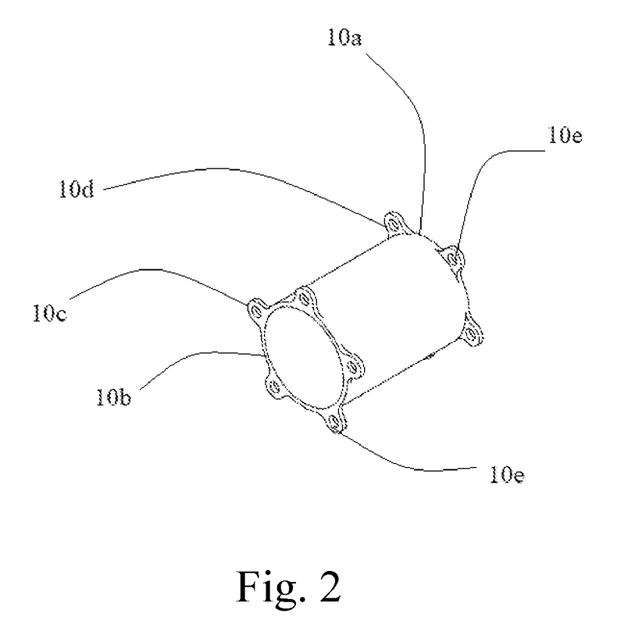
FIG. 2 is a perspective view of the wheel mount circular extension of the present invention.
Figure 3:
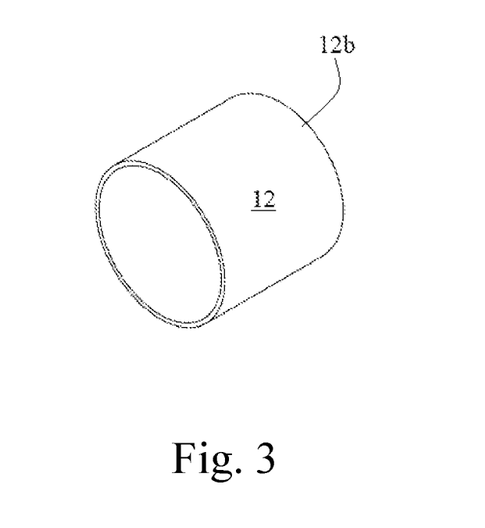
FIG. 3 is a perspective view of a rotor and bearing mount of the present invention.
Figure 4:
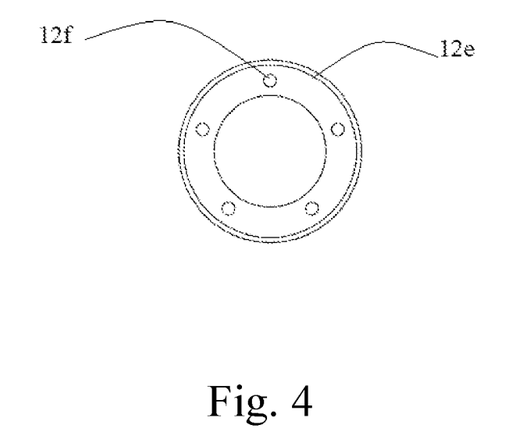
FIG. 4 is a rear view of the rotor and bearing mount of the present invention.
Figure 5:
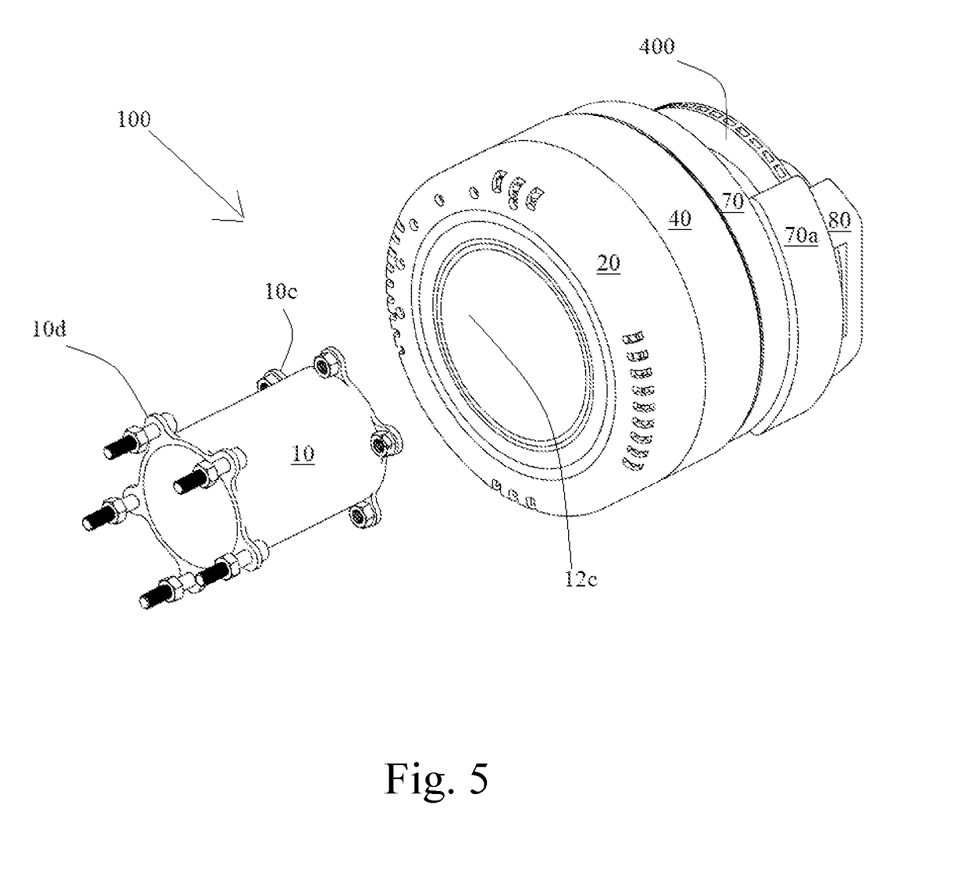
FIG. 5 is a perspective view of the present invention.
Figure 6:
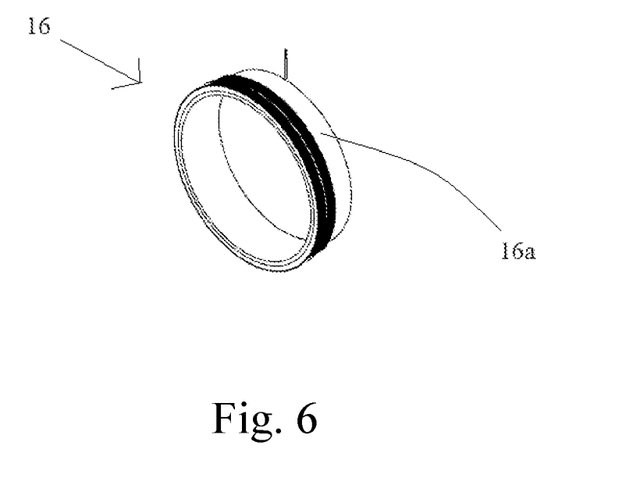
FIG. 6 is a perspective view of a slip ring of the present invention.
Figure 7:
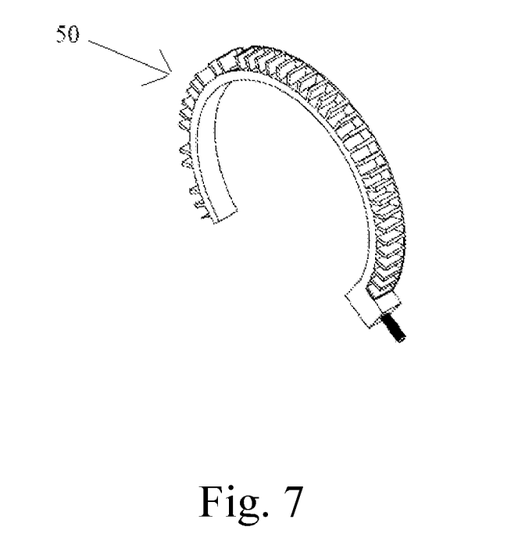
FIG. 7 is a perspective view of a rectifier of the present invention.
Figure 8:
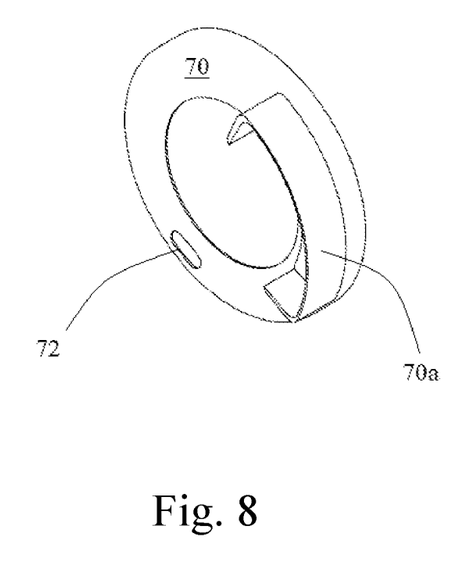
FIG. 8 is a perspective view of a rear cover of the present invention.
Figure 9:
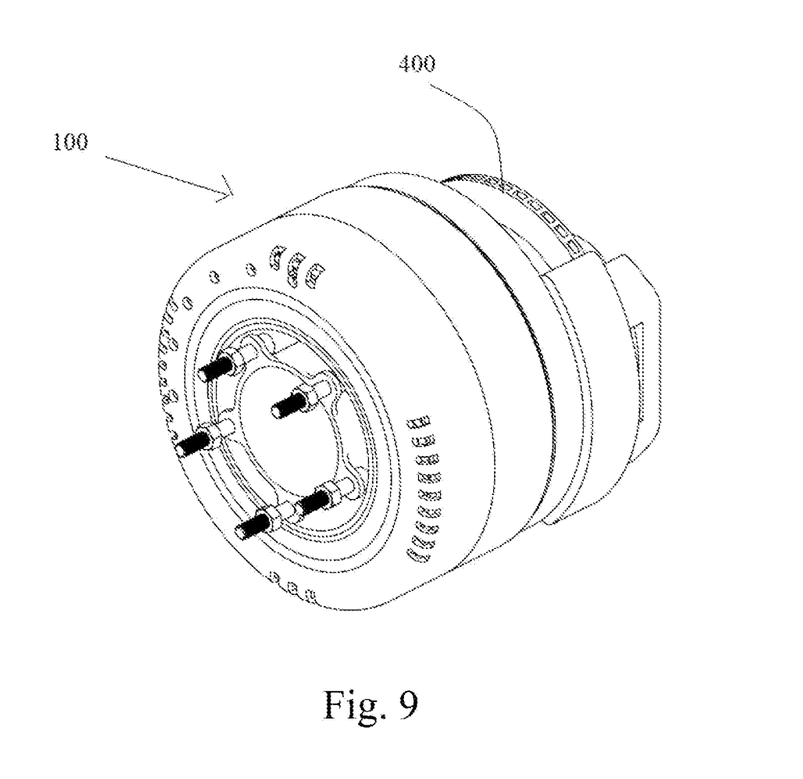
FIG. 9 is a perspective view of the present invention.
Figure 10:
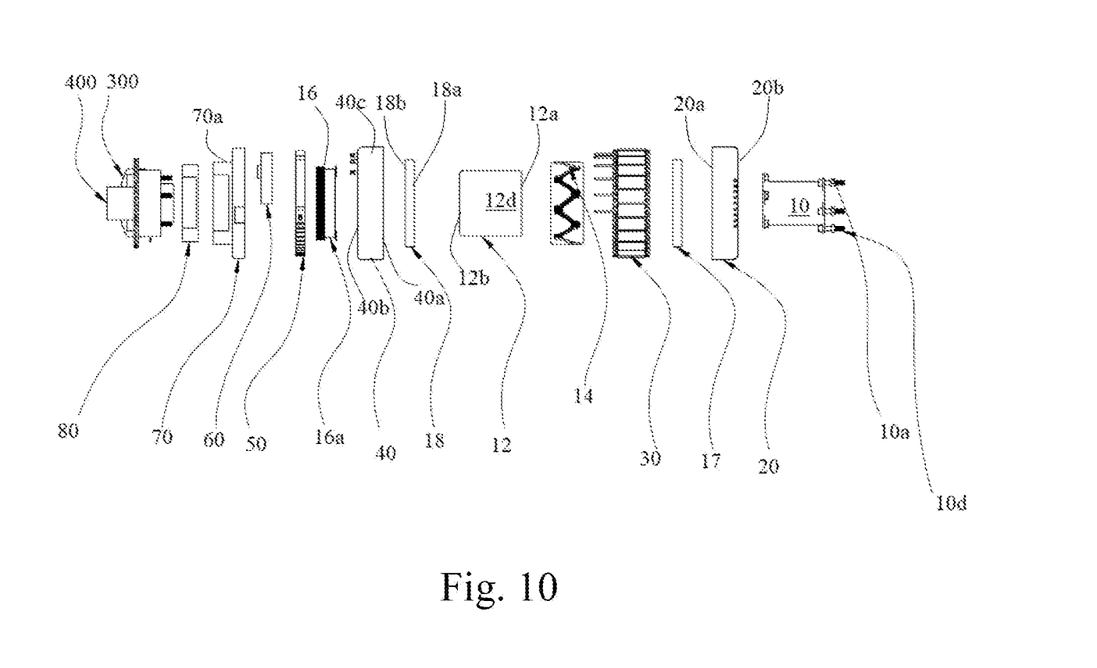
FIG. 10 is a side exploded view of the present invention.

As seen in FIGS. 1-10, the present invention is directed to an alternator system 100 that is used to recharge a battery or battery bank of an electric vehicle that uses wheeled axles to propel itself.

The alternator system 100 comprises of a wheel mount circular extension 10 that has a front side 10*a* and a rear side 10*b*. The rear side 10*b* defines a rear plurality of securing abutments 10*c* that are evenly spaced. The front side 10*a* defines a front plurality of securing abutments 10*d* that are evenly spaced. The rear plurality of securing abutments 10*c* and front plurality of securing abutments 10*d* are radially offset from each other when looking at them from the front side 10*a* to the rear side 10*b* of the wheel mount circular extension (thereby allowing the user to first secure the rear 10*b* and 10*c* to the wheel hub using of a socket extension tool), all securing abutments 10*c*, 10*d* define holes 10*e*. A rotor and bearing mount 12 that has a front side 12*a*, a rear side 12*b*, an inner side 12*c*, and an outer side 12*d*, the rear side 12*b* defines a circular securing structure 12*e* that has a plurality of evenly spaced holes 12f that are aligned to the rear plurality of securing abutments 10c of the wheel mount circular extension 10. A rotor 14 that is fixedly attached to the rotor and bearing mount 12 at a position that is between the front side 12a and the rear side 12b of the rotor and bearing mount 12. A slip ring 16 that is fixedly attached to the rear side 12b of the rotor and bearing mount 12. A front bearing 17 that is mounted on the front side 12a of the rotor and bearing mount 12. A front housing 20 having an open end 20a and a semi-closed end 20b, the front bearing 17 is attached to an inner section 20c of the closed end 20b of the front housing 20. A stator 30 is attached the inner section 20c of the front housing 20 after the front bearing 17 is attached to the inner section 20c of the closed end 20b of the front housing 20. A rear housing 40 having a front section 40a and a rear section 40b, the front section 40a of the rear housing 40 attaches to the open end 20a of the front housing 20, the stator 30 attaches to an inner section 40c of the rear housing 40. A rear bearing 18 having an inner section 18a and an outer section 18b, the outer section 18b of the rear bearing 18 attaches to an inner section of the rear housing 40c that is toward to the rear section 40b of the rear housing, and the inner section 18a of the rear bearing 18 is mounted over an outer section of the slip ring 16a. A rectifier 50 attaches to the inner section of the rear housing 40c at a position that is adjacent to the rear bearing 18. A voltage regulator 60 is attached to the rear housing 40 and is operatively connected to all of the electrically conducing elements of the alternator system 100. A rear cover 70 that covers the rear section 40b of the rear housing 40, the rear cover 70 defines an aperture 72 that allows an electric cabling to go from the alternator system 100 to a battery or a battery bank 200. And, a brake caliper rotation stop 80 that is fixedly attached to a rear outer section of the rear cover 70a, the brake caliper rotation stop 80 mounts over a brake caliper 300 of a wheeled axle 400.

In an embodiment of the present invention, the front plurality of securing abutments 10d and the rear plurality of securing abutments 10c are offset by thirty degrees.

In an embodiment of the present invention, the front plurality of securing abutments 10d and the rear plurality of securing abutments 10c are offset by thirty-six degrees.

In embodiments of the present invention, the front bearing and the rear bearing can be either a ball bearing or a roller bearing.

An advantage of the present invention is that it provides an alternator system that is mounted on each axle of a vehicle and that is used to recharge the battery or battery pack of an electric vehicle when the vehicle moves.

Another advantage of the present invention is that it provides an alternator system that reduces carbon emissions.

Yet another advantage of the present invention is that it provides an alternator system that extends the mileage between the recharges of an electric vehicle.

The embodiments of the apparatus and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the apparatus and method should be construed as limiting the invention to a particular embodiment or combination of embodiments. The scope of the invention is defined by the appended claims, the written description, and the drawings of the present application.

What is claimed is:

1. An alternator system that is used to recharge a battery or battery bank of an electric vehicle that uses wheeled axles to propel itself, the alternator system comprises:
   a wheel mount circular extension that has a front side and a rear side, the rear side defines
   a rear plurality of securing abutments that are evenly spaced and the front side defines a front plurality of securing abutments that are evenly spaced, the rear plurality of securing abutments and front plurality of securing abutments are radially offset from each other when looking at them from the front side to the rear side of the wheel mount circular extension, all securing abutments define holes;
   a rotor and bearing mount that has a front side, a rear side, an inner side, and an outer side, the rear side defines a circular securing structure that has a plurality of evenly spaced holes that are aligned to the rear plurality of securing abutments of the wheel mount circular extension;
   a rotor that is fixedly attached to the rotor and bearing mount at a position that is between the front side and the rear side of the rotor and bearing mount;
   a slip ring that is fixedly attached to the rear side of the rotor and bearing mount;
   a front bearing that is mounted on the front side of the rotor and bearing mount;
   a front housing having an open end and a semi-closed end, the front bearing is attached to an inner section of the closed end of the front housing;
   a stator is attached the inner section of the front housing after the front bearing is attached to the inner section of the closed end of the front housing;
   a rear housing having a front section and a rear section, the front section of the rear housing attaches to the rear section of the front housing, the stator attaches to an inner section of the rear housing;
   a rear bearing having an inner section and an outer section, the outer section of the rear bearing attaches to the rear housing at a position that is to the rear section of the rear housing, and an inner section of the rear bearing is mounted over an outer section of the slip ring;
   a rear bearing having an inner section and an outer section, the outer section of the rear bearing attaches to an inner section of the rear housing that is toward to the rear section of the rear housing, and the inner section of the rear bearing is mounted over an outer section of the slip ring;
   a rectifier is attached to an inner section of the rear housing at a position that is adjacent to the rear bearing;
   a voltage regulator is attached to the rear housing and is operatively connected to all of the electrically conducing elements of the alternator system;
   a rear cover that covers the rear section of the rear housing, the rear cover defines an aperture that allows cables from the alternator system to go to a battery or a battery bank;
   a rear cover that covers the rear section of the rear housing, the rear cover defines an aperture that allows an electric cabling to go from the alternator system to a battery or a battery bank; and
   a brake caliper rotation stop that is fixedly attached to a rear outer section of the rear cover, the brake caliper rotation stop mounts over a brake caliper of a wheeled axle.

2. The alternator system that is used to recharge a battery or battery bank of an electric vehicle that uses wheeled axles to propel itself of claim 1, wherein the front plurality of securing abutments and the rear plurality of securing abutments are offset by thirty degrees.

3. The alternator system that is used to recharge a battery or battery bank of an electric vehicle that uses wheeled axles to propel itself of claim 1, wherein the front plurality of securing abutments and the rear plurality of securing abutments are offset by thirty-six degrees.

4. The alternator system that is used to recharge a battery or battery bank of an electric vehicle that uses wheeled axles to propel itself of claim 1, wherein the front bearing and the rear bearing are either a ball bearing or a roller bearing.

* * * * *